United States Patent [19]

Regester

[11] Patent Number: 5,023,756
[45] Date of Patent: Jun. 11, 1991

[54] LIGHT DIFFUSION BOX

[76] Inventor: Gary L. Regester, P.O. Box 451, Silver Plume, Colo. 80476

[21] Appl. No.: 366,095

[22] Filed: Jun. 13, 1989

[51] Int. Cl.⁵ .............................................. G03B 15/02
[52] U.S. Cl. .................................... 362/16; 362/305; 362/320; 350/314
[58] Field of Search ................. 362/3, 16, 97, 17, 18, 362/307, 320, 343, 346, 352, 355, 363, 367, 293; 353/97, 98; 350/576, 162.18, 162.19, 168, 311, 318, 314, 316; 40/361, 363, 367

[56] References Cited

U.S. PATENT DOCUMENTS

| | | | |
|---|---|---|---|
| 2,205,860 | 6/1940 | Olds | 362/17 |
| 2,286,219 | 6/1942 | Martinek | 350/316 |
| 2,356,694 | 8/1944 | Potter et al. | 350/314 |
| 3,149,968 | 9/1964 | Stephens | 350/314 |
| 3,781,089 | 12/1973 | Fay et al. | 350/314 |
| 3,939,340 | 2/1976 | Gozzano | 362/16 |
| 4,052,607 | 10/1977 | Larson | 362/18 |
| 4,446,506 | 5/1984 | Larson | 362/17 |
| 4,760,498 | 7/1988 | Lang et al. | 362/17 |

FOREIGN PATENT DOCUMENTS

| | | |
|---|---|---|
| 8023043 | 11/1980 | Fed. Rep. of Germany . |
| 8702694 | 4/1987 | Fed. Rep. of Germany . |
| 3535293 | 9/1987 | Fed. Rep. of Germany . |
| 0645735 | 10/1984 | Switzerland ................... 362/16 |

OTHER PUBLICATIONS 4-page Brochure, Plume Ltd., Silver Plume, Colorado, "The New Plume Wafer", Nov. 15, 1985.

Primary Examiner—Stephen F. Husar
Assistant Examiner—D. M. Cox
Attorney, Agent, or Firm—Townsend and Townsend

[57] ABSTRACT

An improved light diffusion box for photographic, industrial and consumer uses. The light diffusion box includes a hollow housing of fabric material provided with a front screen and having means for securing a ring to the rear end thereof, the ring being adapted to mount a light source within the housing. The housing has sides which are coupled together and each side has a silver laminate layer adjacent to a thin, white nylon layer. A deflection/transmission panel is between the light source and the front screen. A graduated or alternated deflection/transmission pattern is printed on at least one face of the panel and such pattern is equal and opposite to the naturally-occurring light fall-off from the light source. The center of the pattern forces the strong light nearest the source to be largely deflected into the sidewalls of the housing and only slightly transmitted. As the pattern radiates outwardly on the panel the pattern allows more and more light to be transmitted through the panel and less to be deflected.

19 Claims, 4 Drawing Sheets

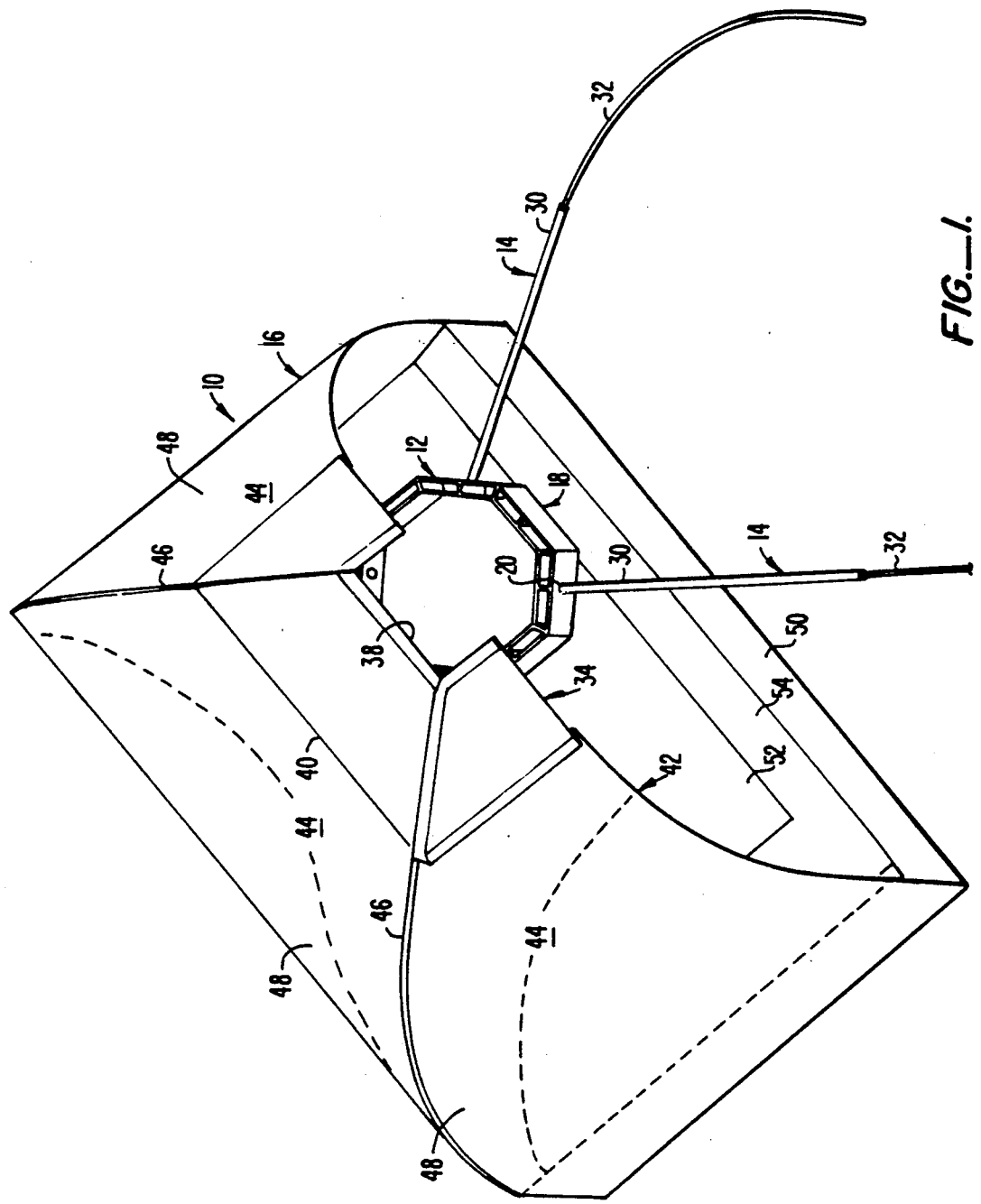
FIG.—1.

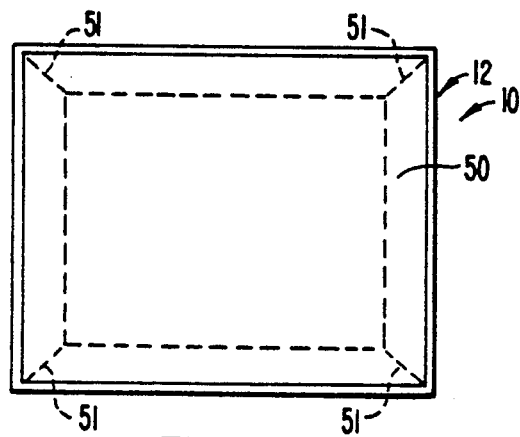
FIG._2.
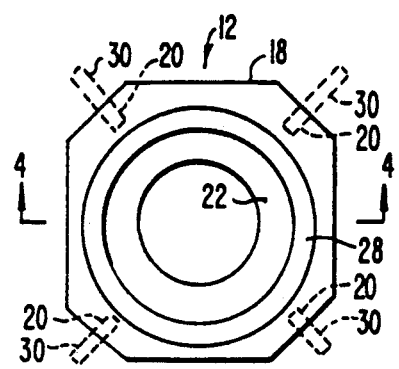
FIG._3.
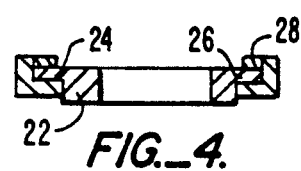
FIG._4.
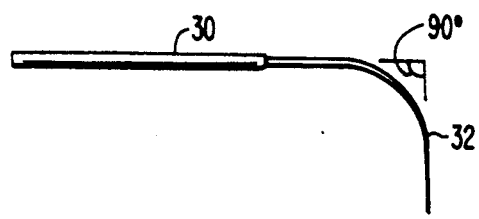
FIG._5.
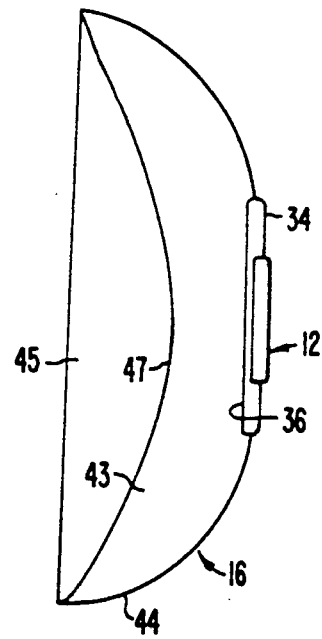
FIG._6.
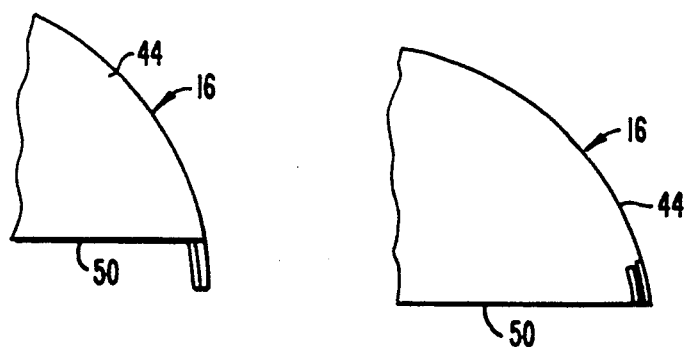
FIG._7a.   FIG._7b.

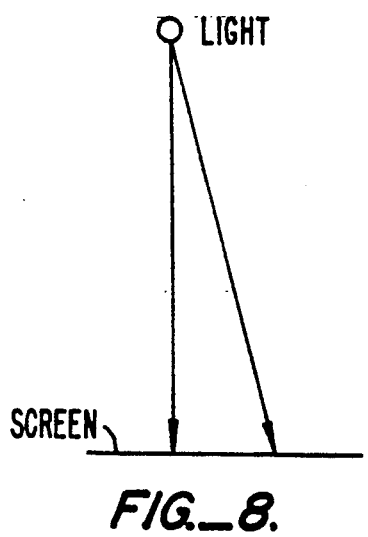
FIG._8.
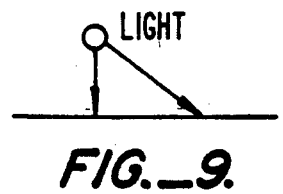
FIG._9.
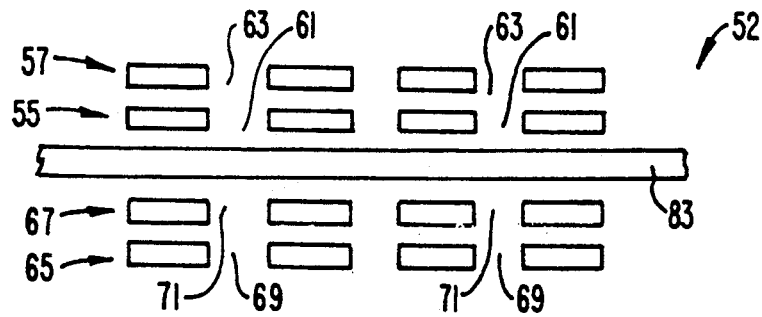
FIG._11.
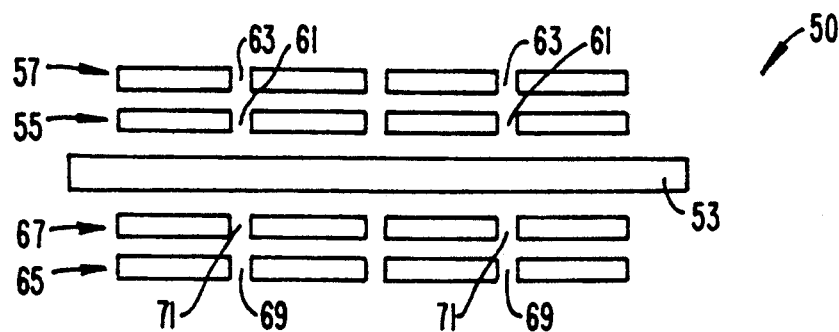
FIG._12.

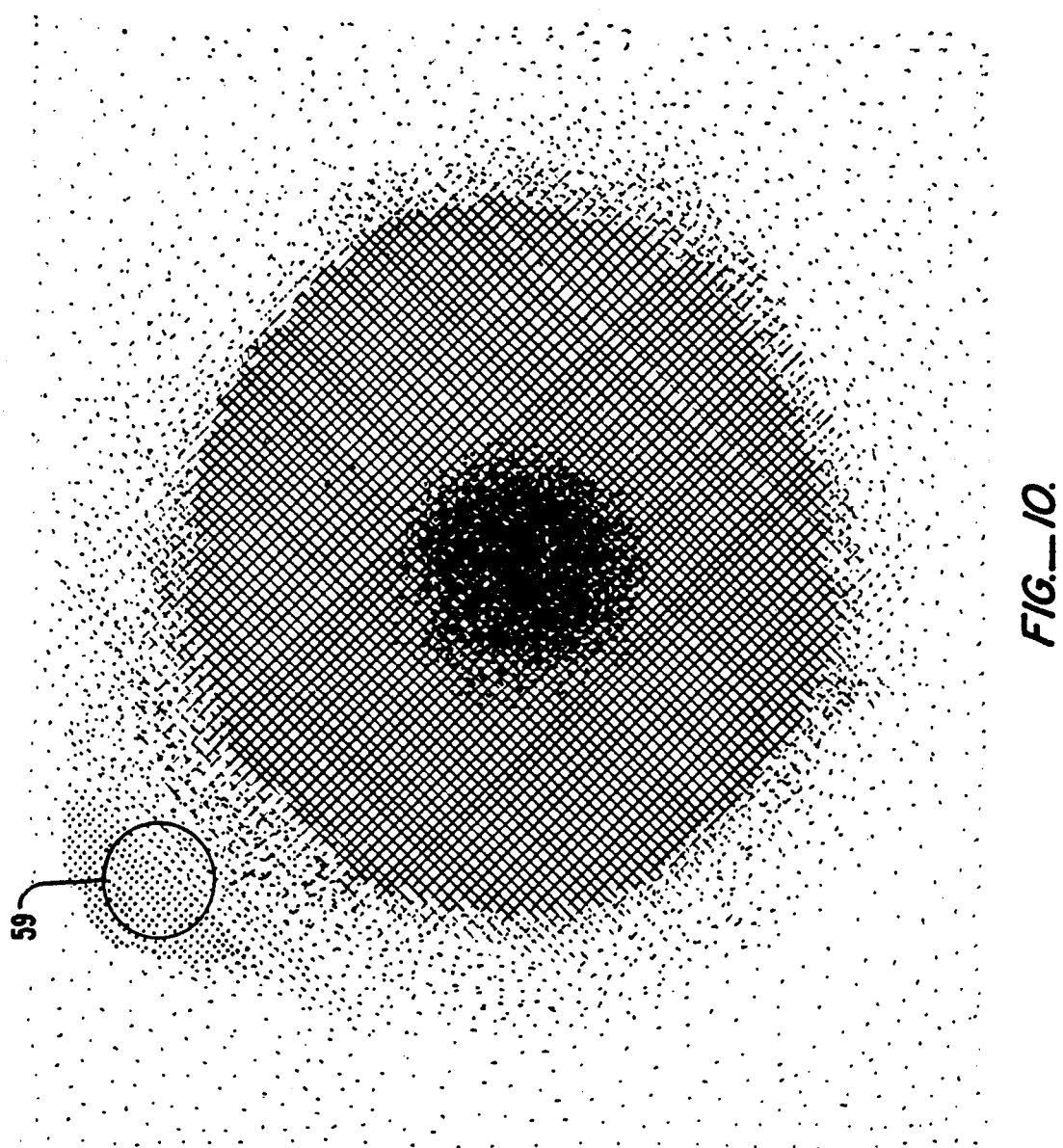
FIG._10.

LIGHT DIFFUSION BOX

This is a Continuation of application Ser. No. 259,078 filed 10/18/88 now abandoned which is a Continuation of application Ser. No. 947,789, filed 12/30/86, now abandoned.

This invention relates to improvements in the distribution and diffusion of light from a light source as used by photographers and others and, more particularly, to an improved light diffusion box having a reflective panel which provides a graduated deflection/transmission pattern that is equal and opposite to the naturally-occurring light fall-off from a light source.

BACKGROUND OF THE INVENTION

Light diffusion boxes for use by photographers and others are well known and have been used extensively in the past. Diffusion boxes of this type have been made with a relatively deep housings and some have been made with relatively shallow housings. The size, weight and supports associated with deep diffusion boxes make them unsatisfactory in use. Many designers of diffusion boxes of this type, such as Breise-Hazylight, Gozzono-Windowlight, and Balli-Opalight, have reduced the depth of the box without shortening the distance that light travels by using a catoptric design. This amounts to originating or deflecting the light source backwardly into the reflective walls from an intermediate point within the diffusion box.

A catoptric design works well if the light source is a given, namely a fixed design integrated with the diffusion device. However, attempts at deflection by means of translucent baffles, metallic cones and the like, such as in the products made by Regester-Chimera, Allwright-Bowens and Larson-Soffbox has thus far proven unsatisfactory in the case of add on diffusion boxes where the characteristics of the available light sources vary and cannot be changed or altered. Because of these drawbacks, a need has existed for some time for an improved light diffusion box which eliminates such problems and results in substantially even light values on the front screen of a relatively shallow housing. The present invention satisfies this need.

SUMMARY OF THE INVENTION

The present invention is directed to an improved light diffusion box which is relatively shallow in depth and which has a light source mounting ring at one end of the housing and a light diffusion screen a the opposite end. A deflection/transmission panel is mounted in some suitable manner between and in spaced relationship to the light source and the front screen. The panel is printed with a layer of white ink and a layer of bluish ink on the white ink layer to provide a graduated or attenuated deflection/transmission pattern that is equal and opposite to the naturally occurring light fall-off from the source of the light. The center of the deflection/transmission pattern forces the strong light nearest the light source to be largely deflected into the sidewalls of the diffusion box and only slightly transmitted. As the pattern radiates outwardly on the panel and the increased distance from the light source reduces the relative light intensity, the pattern allows more and more light to be transmitted and less to be deflected until finally the pattern ends and the light is largely transmitted and only partly deflected.

The deflection/transmission panel thereby allows a specific deflection/transmission pattern to be created for the specific light dispersion characteristics of a number of light sources and will result in substantially even light values on the front screen of the light diffusion box. Also, the deflection/transmission panel and/or pattern may be colored or tinted with color to effect a specific color correction or filtration. The panel itself may be made with the use of silk screen techniques starting with a transparent substrate, such as Mylar, plastic or the like.

The primary object of the present invention is to provide an improved light diffusion box which is simple and rugged in construction, is provided with an improved light deflection/transmission panel between the light source and the front screen thereof whereby the box itself can be relatively shallow in depth and the specific deflection/transmission pattern of the panel will result in substantially even light values on the front screen of the box not-withstanding the shallowness of the housing of the box itself.

Other objects of this invention will become apparent as the following specification progresses, reference being had to the accompanying drawings for an illustration of the invention.

IN THE DRAWINGS

FIG. 1 is a fragmentary, perspective view of the light diffusion box of the present invention, parts being broken away to illustrate details of construction;

FIG. 2 is a front elevational view of the light diffusion box showing the front screen in place;

FIG. 3 is an elevational view of the light source attachment ring for the light diffusion box of FIGS. 1 and 2;

FIG. 4 is a cross sectional view taken along line 4—4 of FIG. 3;

FIG. 5 is a fragmentary side elevational view of a supporting rod structure for one corner of the light diffusion box of the present invention;

FIG. 6 is a schematic, vertical section through the light diffusion box, showing the fabric structure therefor;

FIG. 7a is a fragmentary, schematic view of the light front screen showing one way it can be attached to the front opening of the light diffusion box; but FIG. 7b is a view similar to FIG. 7a showing another way the front screen can be attached to the open front end of the light diffusion box;

FIG. 8 is a graphic view of light rays from a light source spaced a relatively large distance from a light receiving screen;

FIG. 9 is a view similar to FIG. 8 but showing light rays from a light source spaced relatively closely to a light diffusion screen;

FIG. 10 is a view of the deflection/transmission pattern of a deflection/transmission panel between the light source and the front screen of the light diffusion box;

FIGS. 11 and 12 are magnified cross-sectional views of the deflection/transmission panel at an outer peripheral location and at a central location, respectively.

The light diffusion box of the present invention is broadly denoted by the numeral 10 and includes an attachment ring structure 12 having supporting rod structure 14 for connecting the ring structure to fabric structure 16 hereinafter described. While light diffusion box 10 is suitable primarily for photographers use, it can be used for other purposes, such as for industrial (inspection) or consumer uses where controlled diffusion of light from a light source is required.

Ring structure 12 is used to attach the fabric structure 16 to the light source which typically comprises an incandescent bulb and/or light emitting gas-filled tube which has a relatively high power characteristic to emit a relatively large amount of white light to be cast upon a subject which is to be illuminated by light diffusion box 10.

Ring structure 12 typically comprises several parts as shown in FIGS. 3 and 4. An outer ring portion 18 has four corner holes 20 for receiving respective rods of rod structure 14 as hereinafter described. An inner ring 22 is rotatably mounted in an annular recess 24 on the inner periphery of outer ring 18. Ring 22 has a flange 26 which is received in recess 24 and is rotatable with respect thereto. A retaining ring 28 snaps into place and is used to releasably secure rings 18 and 22 together yet allow inner ring 22 to rotate relative to outer ring 18. In the alternative, the outer periphery of the inner ring could be adjustably gripped by a pair of nylon washers at each of a number of locations on the outer ring.

Inner ring 22 has means (not shown) for attaching a light bulb thereto and because of the rotatability of inner ring 22, the light bulb can rotate relative to outer ring 18 as desired or deemed necessary.

Rod structure 14 couples the outer ring 18 with fabric structure 16. To this end, the rod structure 14 for each corner of outer ring 18 is of variable flexibility. To facilitate this, the rod structure 14 of each corner includes a two-part rod including a first rigid, hollow aluminum tube 30 which is received at one end within the hole 20 of outer ring 18. Tube 30 is typically semi-rigid and is adapted to be coupled at its outer end to a more flexible rod segment 32 which is typically a tapered fiberglass rod, the taper being provided to allow for variable flexibility along the length of rod 32. As shown in FIG. 1, tubes 30 associated with the four corners of outer ring 18 are relatively straight; whereas, the rod segments 32 bend in the manner shown in FIG. 1 so as to provide a distinctive shape for fabric structure 16. Specifically, the shape is rectangular at the front face of the fabric structure 16 as shown in FIG. 2 yet the fabric portion rearwardly of the front face is under tension by virtue of the flexibility and tensioning of rod segments 32 as shown in FIG. 1. FIG. 5 shows the way in which the tubes 30 remain essentially straight; whereas, the rod segments 32 bend so as to form a 90° angle between the longitudinal axis of the tube 30 and a line passing through the outer tip of the corresponding rod segment 32.

Fabric structure 16 is comprised of three parts which are constructed to assist in equalizing the fall-off of light from the light source carried by ring structure 12.

A first part of fabric structure 16 is broadly denoted by the numeral 34 and includes an inner surface 36 coated with silicon so as to resist the high temperature associated with the light source coupled to ring structure 12. The first part 34 is coupled in any suitable manner to sides 44, such as by Velcro 36 (FIG. 1) which are at the diagonal portions of the part 34, there being a central opening 38 in part 34 to accommodate the light source coupled with ring structure 12. The part 34 generally has an outer, rectangular margin 40 which is coupled in any suitable manner to the second part 42 of fabric structure 16. Second part 42 includes four trapezoidal sides 44, only three of which are shown in FIG. 1 and two of the three shown in FIG. 1 being cut away to illustrate the details of construction of the interior of light box 10.

The silicon coated part 34 is wide on surface 36 so also to diffuse and lower the spectral value of the light source and its immediate surroundings.

Second part 42 has a pebbled silver laminate layer on the inner surface of each side 44 respectively. FIG. 6 shows layer 43 on one of the sides 44. The silver laminate extends from the outside edge of each side 44 to a location near the first part 34. A very thin white nylon layer 45 is provided on the remaining region of inner surface of each side 44, the thin nylon attaching to the front edge 47 of the layer 43 and proceeds from corner to corner of each of the diffusion box walls 44 in a broad arch so that its apex covers the silver laminate closest to the light source and conversely does not cover the silver in the far corners where the light intensity is the least.

The four sides 44 are joined together at adjacent margins thereof to form eyelets 46 adapted to receive respective rod segments 32 the with shapes of the sides 44 being such that they form a convex outer surface 48 which rolls outwardly and forwardly as the front end of light diffusion box 10 is approached.

The construction thus far described presents a configuration for light diffusion box 10 which is relatively shallow from ring structure 12 to the front end of the fabric structure 16. This front open end is closed by front screen 50 (FIGS. 1 and 2) which is coupled in any suitable manner to second part 42. For purposes of illustration, FIGS. 7a and 7b show two different ways to couple front screen 50 to the front margin of second part 42. For instance, FIG. 7a shows Velcro material on the outer peripheral margins of sides 44 and front screen 50 such that the front screen 50 is recessed slightly within the front open end defined by the front margins of sides 44. This creates a lip on the edge of the diffusion box. In the alternative, the Velcro could be coupled together such that the front screen will be flush with the front end of the box defined by the front margins of sides 44. Light diffusion box 10 further includes a deflection/transmission panel 52 located between the light source and front screen 50. The purpose of this panel 52 is to provide a substantially even light values on the front screen 50. As shown in FIG. 2, panel 52 includes means 51 for securing the outer marginal edges of the panel to the housing.

The inverse square law is defined as "the intensity of illumination diminishes as the square of the distance from the light source increases". Originally defined and known as Lambert's law of illumination by Johann Lambert, a Swiss-German physicist (1728-1777) as "the illumination of a surface on which light falls normally from a point source is inversely proportional to the square of the distance of the surface from the light source. If the normal to the surface makes an angle with the direction of the rays, the illumination is proportional to the cosine of that angle".

Conventional light diffusion boxes have a greater light value on the screen closest to the light source, usually the center of the screen, and a lessor value on the edge or corner where the surface of the screen is farthest from the light. The deeper the diffusion box, that is, the greater the distance from the screen to the light source (FIG. 8), the less the difference from screen center to edge or corner and a more "even" the screen value. Conversely, the shallower the diffusion box as in the present invention, the greater the difference in light value from screen center to edge or corner (FIG. 9).

As shown in FIG. 11, panel 52 includes a substrate 53 provided with a layer 55 of a reflective coating material, specifically a white ink applied in a half-tone dot matrix pattern. A second layer 57 of a coating material containing a pigment of a specific color, such as bluish ink, is applied onto layer 55 so that layers 55 and 57 provide a graduated or attenuated deflection/transmission pattern which is shown graphically in FIG. 10, the view of panel 52 shown in FIG. 11 being taken in the outer peripheral vicinity denoted by the numeral 59 (FIG. 10). Layers 55 and 57 are perforate to present holes, spaces or openings 61 and 63 (FIG. 11) which result when the layers 55 and 57 are applied, such as by a silkscreen process. The layers 55 and 57 are applied to the side of substrate 53 opposite to the side facing the light source; thus, the light first travels through the substrate before it passes onto layers 55 and 57.

The first layer of white ink and the second layer of coating material with a specific pigment, such as bluish ink, are required to maintain the correct color temperature. The white ink, which is neutral when reflective, is yellow when light passes through it (translucent). The second layer of coating material with pigment is added to correct and offset the yellow translucent color change, resulting in a neutral transmission of light through the two layers 55 and 57.

While FIG. 11 shows a view of the pattern at an outer peripheral location on the panel 52, FIG. 12 shows the pattern near the center of the panel 52. It can be noted that layer 55 has narrower openings or holes 61 with reference to holes 61 and 63 of the pattern as shown in FIG. 11. Openings 61 and 63 are of the same size and in registry with each other at all locations across the panel and such registry is required to provide for the proper deflection in transmission of light with respect to the panel 52.

The spacings 61 and 63 can be closer together or further apart depending upon a particular light source which must be accommodated by panel 52. It is also possible to provide material coatings, such as white and bluish ink layers 65 and 67, on the opposite side of the substrate as shown in FIG. 11 to provide a four-layer pattern. In such a case, the openings 69 and 71 of the third and fourth layers will be of the same size and in registry with each other and in registry with openings 61 and 63 of layers 55 and 57. However, the bluish layer 67 will be closer to substrate 52 then will whitish ink layer 65. The combination of the white and bluish ink layers in layer 65 and 67 is for the same purposes as mentioned above with respect to the ink of layers 55 and 57. FIG. 12 also shows the layers 65 and 67 being of the same hole size in hole size 69 and 71 as hole sizes 61 and 63.

A suitable substrate is preferably sailcloth used for windsurfing. Suitable sailcloth products are those identified as TRIPLY made by GTS of Bracknell England and TRYLAM made by Dimension Sail Company of Putnam, Conn.

The pattern of FIG. 10 as defined by the ink or pigment layers described above is equal and opposite to the naturally occurring light fall-off pattern from the light source. The center of this deflection/transmission pattern forces the strong light nearest the source to be largely deflected onto the sidewalls of the interior of the diffusion box 10 and only slightly transmitted. As the pattern radiates outwardly on the panel and the increased distance in the light source reduces the relative light intensity, the deflection/transmission pattern allows more and more light to be transmitted and less to be deflected until finally the pattern ends and the light is largely transmitted and only partly deflected.

This design allows a specific deflection/transmission pattern to be created for the specific light dispersion characteristics of many different light sources and will in all cases result in substantially even light values on the front screen 50. Also the deflection/transmission panel and or pattern may be colored or tinted with color to effect specific color correction or filtration. In the alternative, another panel of translucent material denoted by the numeral 54 (FIG. 1) can be provided to effect a specific color correction or filtration.

A process for making the panel 50 is to provide first a substrate of Mylar, plastic or the like and then to perform a series of steps. The process is as follows:

In step one, make a film transparency of the front surface of a translucent material placed in the diffusion box at the position intended for the panel 52. Illuminate the panel from behind by a specific light source. Considered in transparent values, this results in a bright (−) center value (cv) and a dim (+) edge value (ev).

In step two, make an engravers half-tone in film negative (cv+, ev−). Contact a film positive (cv−, ev+). Enlarge to film negative of intended size (cv+, ev−).

In step three, silk screen this last pattern onto the transparent substrate, with a white ink thereby creating the graduated or attenuated deflection/transmission pattern of panel 52. FIG. 10 substantially shows the pattern of panel 52 as it is intended to be used in light diffusion box 10.

What is claimed:

1. A light diffusion box for illumination of objects to be photographed comprising:
a housing of fabric material, said housing having a pair of opposed ends; a mounting means coupled to the housing at one end thereof, said mounting means adapted to mount a single point light source in the housing with the light radiating from the light source into and through the housing; a light diffusion screen coupled to the housing at the opposite end thereof, and a deflection/transmission panel between the mounting means and the screen and having a deflection/transmission pattern equal and opposite to the naturally-occurring light fall-off pattern from the light source so as to result in substantially even light values of the light rays falling on the front screen, the panel having a substrate of flexible material, and at least one layer of coating material on one face of the substrate.

2. A light diffusion box as set forth in claim 1, wherein the panel includes means for securing the outer marginal edges of the panel to the housing.

3. A light diffusion box as set forth in claim 1, wherein the panel is substantially parallel with said screen.

4. A light diffusion box as set forth in claim 1, wherein said layer is of a non-white pigment.

5. A light diffusion box as set forth in claim 1, wherein a second layer of coating material is on the substrate, the coating material of the first layer is whitish ink, and the coating material of the second layer is bluish ink.

6. A light diffusion box as set forth in claim 5, wherein each layer is a half-tone dot matrix.

7. A light diffusion box as set forth in claim 6, wherein the matrix has a hole size which varies form a minimum at a location aligned with the light source to a maximum at location remote from and out of alignment with the light source.

8. A light diffusion box as set forth in claim 5, wherein the first layer is applied to one face of the substrate, and the second layer being applied to outer face of the first layer.

9. A light diffusion box as set forth in claim 8, wherein the first layer is of white ink, and the second layer is of bluish ink.

10. A light diffusion box as set forth in claim 1, wherein said housing includes a number of sides, each side having a first section of pebbled silver laminate and a second section provided with a white nylon surface adjacent to the first section.

11. A light diffusion box as set forth in claim 1, wherein is included a second deflection/transmission panel in the housing between the ends of the housing.

12. A light diffusion box as set forth in claim 11, wherein the second deflection/transmission panel is between the screen and the first-mentioned deflection/transmission panel.

13. A light diffusion box comprising:
a housing of fabric material, said housing having a pair of opposed ends; a mounting means coupled to the housing at one end thereof, said mounting means adapted to mount a light source in the housing with the light radiating from the light source into and through the housing; a light diffusion screen coupled to the housing at the opposite end thereof; and a deflection/transmission panel between the mounting means and the screen and having a deflection/transmission pattern equal and opposite to the naturally-occurring light fall-off pattern from the light source so as to result in substantially even light values of the light rays falling on the front screen, the panel having a flexible substrate, and a number of layers of coating material on the panel, said coating material defining said fall-off pattern.

14. A light diffusion box as set forth in claim 13, wherein the at least two layers are on one side of the substrate.

15. A light diffusion box as set forth in claim 13, wherein is included a second deflection/transmission panel in the housing between the ends of the housing.

16. A light diffusion box as set forth in claim 15, wherein the second deflection/transmission panel is between the screen and the first mentioned deflection/transmission panel.

17. A light diffusion box for illumination of objects to be photographed comprising:
a housing of fabric material, said housing having a pair of opposed ends; a mounting means coupled to the housing at one end thereof, said mounting means adapted to mount a single point light source in the housing with the light radiating from the light source into and through the housing; a light diffusion screen coupled to the housing at the opposite end thereof; and a deflection/transmission panel having a deflection/transmission pattern equal and opposite to the naturally-occurring light fall-off pattern from the light source so as to result in substantially even light values of the light rays falling on the front screen, the panel having a substrate, a first layer of coating material of a first color on one face of the substrate and a second layer of coating material having a non-white pigment on the outer face of the first layer, each of said layers having a plurality of holes therethrough, the holes associated with one layer being of the same size and in registry with corresponding holes of the other layer.

18. A light diffusion box comprising:
a housing of fabric material, said housing having a pair of opposed ends; a mounting means coupled to the housing at one end thereof, said mounting means adapted to mount a light source in the housing with the light radiating from the light source into and through the housing; a light diffusion screen coupled to the housing at the opposite end thereof; and a deflection/transmission panel having a deflection/transmission pattern equal and opposite to the naturally-occurring light fall-off pattern from the light source so as to result in substantially even light values of the light rays falling on the front screen, the panel having a substrate, a first layer of white coating material and a second layer of coating material having a non-white pigment therein, said first layer being on one face of the substrate and the second layer being on the outer face of the first layer, there being a third layer of coating material on the opposite face of the substrate and a fourth layer of coating material on the outer face of the third layer, each of the third and fourth layers having a plurality of holes therethrough, the holes associated with the third layer being of the same size and in registry with corresponding holes of the fourth layer.

19. A light diffusion box as set forth in claim 18, wherein the holes of the third and fourth layers are of the same size and in registry with corresponding holes of the first and second layers.

* * * * *